Jan. 3, 1939. H. E. MORTON Re. 20,964

DISTRIBUTOR HEAD

Original Filed July 5, 1934

INVENTOR.
HARRY E. MORTON,
BY Robert J. Palmer
ATTORNEY.

Reissued Jan. 3, 1939 Re. 20,964

UNITED STATES PATENT OFFICE 20,964

DISTRIBUTOR HEAD

Harry E. Morton, Boston, Mass., assignor to B. F. Sturtevant Company, Inc., Boston, Mass.

Original No. 1,985,617, dated December 25, 1934, Serial No. 733,844, July 5, 1934. Application for reissue May 14, 1936, Serial No. 79,781

16 Claims. (Cl. 62—127)

This invention relates to expansion valves and distributor heads for refrigeration evaporators, and relates more particularly to expansion valves and distributor heads for use with refrigeration evaporator coils used as air cooling coils in air conditioning systems.

With the advent of non-toxic refrigerants, it has become common practice to expand such refrigerants directly in extended surface air cooling coils for air cooling purposes, in air conditioning systems. In order, however, to obtain sufficient surface in contact with the air being cooled, it is necessary to provide not only extended surface on the coils, but to provide a large number of separate coils extended crossways the air stream, and also a large number of coils in multiple or parallel relationship. Where so many coils are used, it has been found that the ordinary expansion valve is not suitable for expanding refrigerant into cooling coils because of the problems of unequal distribution. In a small number of the coils gas may enter, in another group of the coils a mixture of gas and liquid, and some of the coils will contain liquid. This is not satisfactory, of course, because in order for efficient operation, an equal amount of liquid and gas should be supplied to each of the evaporator coils. In the past, in order to overcome these difficulties, a number of expansion valves have been provided, one for each row or pair of rows of coils.

According to the present invention, a single expansion valve is provided with a single distributor head. The distributor head is provided with a series of small orifices, each connecting with a row of air cooling evaporator coils. With this arrangement, only partial expansion of the refrigerant at the regulating expansion valve is permitted, and the passages on the low pressure side of this regulating valve have insufficient area to permit complete expansion to the evaporator pressure. Thus, the intermediate pressure is maintained up to the distributor head, and the final expansion takes place in the individual tubes leading to the evaporator coils.

An object of this invention is to regulate the flow of a refrigerant through a single expansion valve and to apportion it equally to each of a plurality of rows of evaporator coils.

Another object of the invention is to supply to each of a plurality of rows of evaporator coils, an equal quantity of a uniform mixture of gas and liquid.

Other objects of the invention will be apparent from the following description taken together with the drawing.

The invention will now be described with reference to the drawing, of which:

Figure 1:
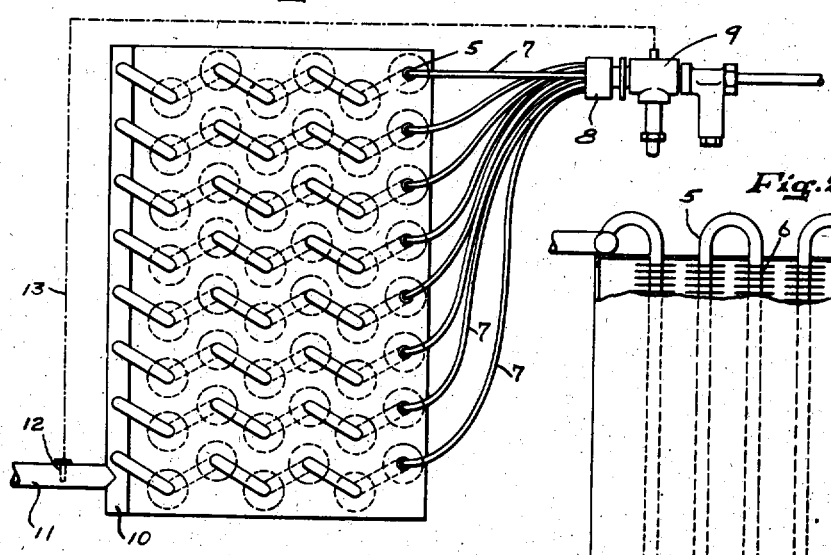
Fig. 1 is a side view of an assembly of extended surface, evaporator coils used as air cooling coils for air conditioning purposes, with each horizontal row of coils attached to a separate tube leading to the distributor head of a single expansion valve.

The evaporator coil assembly of Fig. 1 comprises the rows of coils 5, which are provided with the extended surfaces 6, and which are arranged in a plurality of both horizontal and vertical rows. Each horizontal row of coils is supplied with expanded refrigerant through an individual tube 7, leading from the distributor head 8 of the expansion valve indicated generally by 9. Each horizontal row of coils discharges into the common header 10, from which the pipe 11 conducts the low pressure gas after the complete evaporation of the refrigerant in the coils. The pipe 11 contains the ordinary thermostat element 12, connected by tube 13 to the valve mechanism in the expansion valve 9, this control mechanism serving, as is well known, to control the rate of flow of the refrigerant in accordance with the temperature of the low pressure gas leaving the coils. Details of this control will be discussed in connection with the description of Fig. 3 of the drawing.

Figure 2:
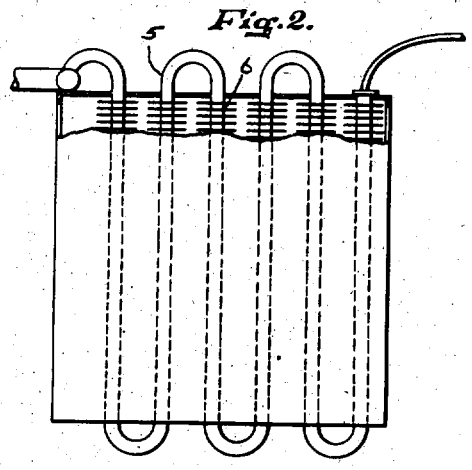
Fig. 2 is an end view, with a portion of the side removed, of the coil assembly of Fig. 1.

As shown by Fig. 2, each of the horizontal rows of coils is interconnected at each end to form several extended surface cooling coils arranged in series relationship, and, as shown by Figs. 1 and 2 taken together, each of the horizontal rows of coils is connected in multiple or parallel relationship with every other horizontal row of coils. With this series-parallel arrangement of the plurality of coils provided with extended surfaces, a considerable cooling surface is provided for extracting heat from the air to be conditioned, which is moved past the outer surface of the coils by a fan or blower. As stated before, the difficulty in the past has been to provide an equal amount of refrigerant to each of a large number of coils, but this is accomplished by the present invention by the distributing arrangement which will now be described in connection with Figs. 3 and 4 of the drawing.

As in ordinary practice, the liquid refrigerant under high pressure is forced into the expansion valve 9 through the high pressure inlet 14. The expansion valve 15 is moved under control of the thermostat element 12 (Fig. 1) to permit the partial expansion of the refrigerant past the valve piston 15 into the intermediate pressure channel 16. As temperature variations take place in the outlet pipe 11, shown by Fig. 1, evaporation or condensation of suitable liquid in the tube 13, takes place, and the resultant change in pressure causes movement of the diaphragm 17 of Fig. 3 against the lower portion of which the member 18 is in contact and is moved by the movement of the diaphragm 17 to move the expansion valve piston 15 from its seat to permit the high pressure liquid entering the expansion valve to pass to the high pressure passage 14, past the valve piston 15, and into the intermediate gas pressure passage 16. Movement of the member 18 is communicated to the piston 15 through the intermediate rod 20, and movement of the piston 15 is opposed by the usual spring control 21.

The distributor head 8 contains eight small openings 19, which are tapped to receive the threaded ends of the tubes 7, which connect the distributor head with the horizontal rows of coils (Fig. 1). To the rear of each of the ends of the tubes 7, which are screwed into the distributor head 8, are the open spaces 22, which communicate not only with the inlets to the tubes 7, but to the space beneath the diaphragm 18 through the intermediary of the channels 23, 24, 25 and 26, and also to the intermediate gas pressure channel 16 on the output side of the expansion valve through the intermediary of the channels 27, the chamber 28, the space surrounding the spinner 29, the channel 30, and chamber 31.

The channels 27 serve as orifices through which final expansion of the refrigerant takes place into the spaces 22 and the individual tubes 7.

Figure 3:
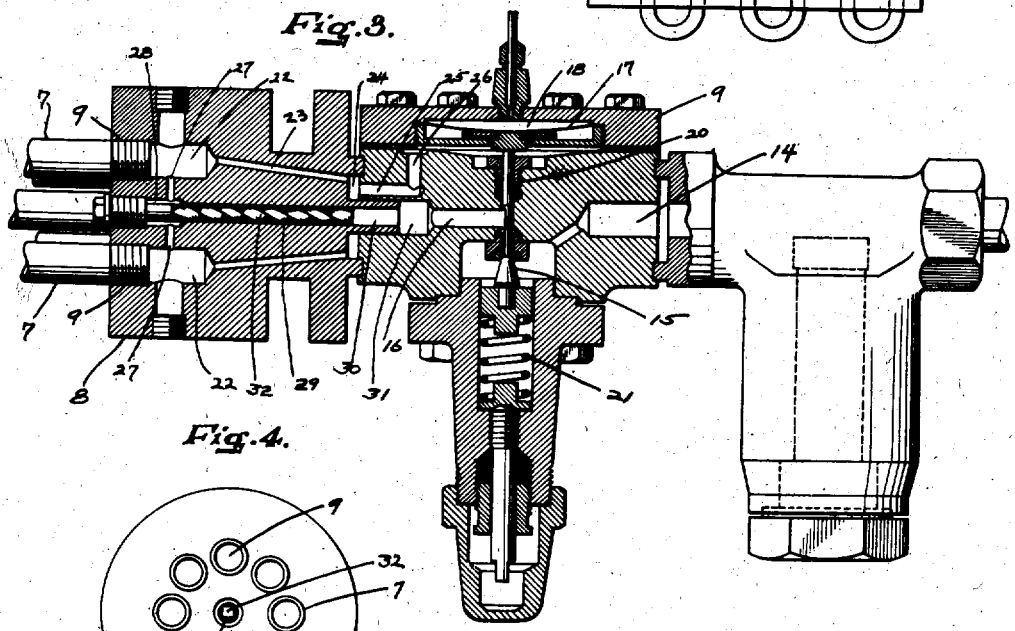
Fig. 3 is a side view, partially in section, of the expansion valve and distributor head of Fig. 1.
Figure 4:
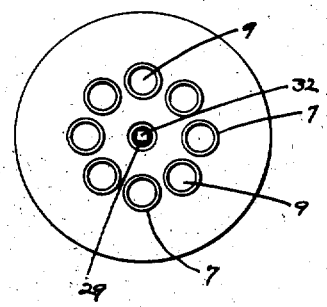
Fig. 4 is an end view of the distributor head of Fig. 3.

The spinner 29 is a metal strip, twisted to assume the shape shown by Figs. 3 and 4, so as to form the spinning channels 32 through which the refrigerant leaving the chamber 30 passes in a spinning movement, which prevents the segregation of the liquid from the gas and consequent uneven distribution of the liquid at the time that it enters the individual orifices 27.

Through each of the individual orifices 27, the mixed gas and liquid is fed in substantially equal amounts, and upon passing into the chambers 22 and tubes 7, a portion of the remainder of the liquid is expanded into gas, with the result that gas and liquid passes into each of the tubes 7.

The passages leading from the low pressure channel 16 to the evaporator tubes are made to have insufficient area to permit complete expansion to the evaporator pressure, with the result that the complete expansion finally takes place in the individual tubes 7, where it is desired.

The orifices 27 should be so proportioned as to provide a total area not exceeding 125% of the area of channels 16 and 30, which latter are of the same diameter.

With the arrangement above described, the compressed refrigerant enters through the high pressure channel 14 as liquid, part of it is converted into gas as it passes the piston of the expansion valve, and beyond that point a mixture of gas and liquid is handled. Under most operating conditions, the ratio by volume of liquid to gas is low, and to prevent the liquid from separating by gravity or other forces from the gas, it is found necessary, for most efficient operation, to insert the spinner 32, which prevents segregation of the liquid from the gas up to the time that the mixture is fed into the final orifices 27.

In order that the control pressure acting upon the piston of the expansion valve be the pressure in the evaporator and not the intermediate pressure, this invention provides the passages 23, 24, 25 and 26 leading from the evaporator tubes to a space on the under side of the diaphragm 17. This arrangement is believed to be the most desirable one, but, obviously, equivalent arrangements are the substitution of an external connection from the evaporator to the chamber of the diaphragm, or a connection from the outlet end of the evaporator tubes to the chamber underneath the diaphragm, it only being necessary, as stated above, that the control pressure be the evaporator pressure and not the intermediate pressure.

In the foregoing, each of a plurality of rows of evaporator coils has been described as being provided, according to this invention, with an equal quantity of gas and liquid. This represents, however, ideal conditions where each row of coils is under equal load. In some cases, however, the air load may be definitely less on some individual coils, due to their location with respect to entering and leaving air, or to other reasons, and to prevent flooding of the coils with the lesser load, the orifices 22 leading to such coils may be reduced in size. In this way, there may be a variety of sizes of orifices in any one distributor to adjust the amount of gas and liquid fed to individual coils in accordance with load distribution.

While one embodiment of the invention has been described for the purpose of illustration, it should be understood that the invention is not limited to the details described, since many modifications may be made by those skilled in the art without departing from the spirit of the invention.

What is claimed is:

1. Refrigeration apparatus, comprising an expansion valve, a distributor head, a plurality of evaporators, means forming a plurality of outlet openings in said head for connection, one to each of said evaporators, means connecting said openings and said evaporators, means forming a substantially horizontal channel connecting said head with the output side of said valve, means forming a plurality of constricted orifices with axes substantially perpendicular to the axes of said openings, one for each of said evaporators, means connecting said orifices with said outlet openings, and means in said channel for preventing the segregation of unevaporated liquid from the evaporated liquid in its travel between said valve and said orifices.

2. Refrigeration apparatus, comprising an expansion valve, a distributor head, a plurality of groups of evaporators, means forming a plurality of outlet openings having substantially parallel axes in said head for connection, one to each of said groups of evaporators, means connecting said openings and said evaporators, means forming a channel connecting said head with the output side of said valve, means forming a plurality of constricted orifices, one for each of said evaporators, connecting with said channel and having axes substantially perpendicular to said axes of said openings, and means connecting said orifice with said outlet openings.

3. An expansion mechanism for refrigerant evaporators, comprising in combination, an expansion valve adapted to be supplied with high pressure refrigerant, a distributor head, a plurality of substantially similar evaporators, a plurality of substantially similar tubes connecting said head with said evaporators, means in said valve for expanding the high pressure refrigerant into a fluid of gas and liquid at an intermediate pressure, means forming a plurality of substantially similar constricted orifices, one for each of said tubes, each having a cross sectional area substantially less than the cross sectional area of the opening in its associated tube for substantially expanding said fluid into its associated tube, and means for maintaining the fluid at a pressure not less than said intermediate pressure in its travel between said valve and said orifices.

4. An expansion mechanism for refrigerant evaporators, comprising an expansion valve, a distributor head, means forming a plurality of outlets in said head for connection to a plurality of evaporators, means forming a plurality of orifices between said outlets and the output side of said valve, a diaphragm, a thermostat exposed to gas from said evaporators, means acting on one side of said diaphragm for moving same proportional to variations in said thermostat, means connecting said diaphragm and valve whereby said valve is moved proportional to the movement of said diaphragm, and means transmitting gas pressure from between said orifices and said outlets to the other side of said diaphragm.

5. An expansion mechanism for refrigerant evaporators, comprising an expansion valve, a distributor head having a plurality of outlets for connection to evaporators, means forming a plurality of orifices between said valve and said outlets, and a spiral spinner between said valve and said orifices for mixing liquid refrigerant and gas in its travel between said valve and said outlets.

6. An expansion mechanism for refrigerant evaporators, comprising an expansion valve, a distributor head having a plurality of outlets for connection to evaporators, means forming a plurality of orifices between said valve and said outlets, means forming a channel between said valve and said orifices, and means in said channel for causing the refrigerant to pass therethrough in an advancing spiral.

7. An expansion mechanism for refrigerant evaporators, comprising an expansion valve, a distributor head having a plurality of outlets for connection to evaporators, means forming a plurality of orifices between said valve and said outlets, means forming a channel between said valve and said orifices, and means comprising a spiral spinner in said channel for causing the refrigerant to pass therethrough in an advancing spiral.

8. An expansion mechanism for refrigerant evaporators, comprising an expansion valve, a distributor head having a plurality of outlets with substantially horizontal axes, means forming a plurality of orifices with substantially radial axes between said valve and said outlets, means forming a plurality of chambers between said outlets and said orifices, means forming a substantially horizontal channel arranged centrally with respect to said orifices and between same and said valve, and a spinner in said channel for intimately mixing the gas and liquid in its travel between said valve and said orifices.

9. An expansion mechanism for refrigerant evaporators, comprising an expansion valve, a distributor head having a plurality of outlets with substantially horizontal axes, means forming a plurality of orifices with substantially radial axes between said valve and said outlets, means forming a plurality of chambers between said outlets and said orifices, means forming a substantially horizontal channel arranged centrally with respect to said orifices and between same and said valve, a diaphragm, a thermostat exposed to gas from said evaporators, means connecting one side of said diaphragm and said thermostat for moving said diaphragm proportional to temperature changes in said thermostat, means connecting said diaphragm and valve whereby said valve is moved with movements in said diaphragm, and means forming gas passages from said chambers to the other side of said diaphragm.

10. An expansion mechanism for refrigerant evaporators, comprising an expansion valve, a distributor head having a plurality of outlets with substantially horizontal axes, means forming a plurality of orifices with substantially radial axes between said valve and said outlets, means forming a plurality of chambers between said outlets and said orifices, means forming a substantially horizontal channel arranged centrally with respect to said orifices and between same and said valve, a spinner in said channel for intimately mixing the gas and liquid in its travel between said valve and said orifices, a diaphragm, a thermostat exposed to gas from said evaporators, means connecting one side of said diaphragm and said thermostat for moving said diaphragm proportional to temperature changes in said thermostat, means connecting said diaphragm and valve whereby said valve is moved with movements in said diaphragm, and means forming gas passages from said chambers to the other side of said diaphragm.

11. An expansion mechanism for refrigerant evaporators, comprising an expansion valve, a distributor head having a plurality of outlet openings for connection to evaporators, said head including a plurality of chambers, one connecting with each of said outlets, means in said head forming a plurality of orifices connecting one with each of said chambers, and means connecting said orifices with said valve.

12. An expansion mechanism for refrigerant evaporators, comprising an expansion valve, a distributor head having a plurality of outlet openings for connection to evaporators, said head including a plurality of chambers, one connecting with each of said outlets, means in said head forming a plurality of orifices having radial axes arranged in a substantially vertical plane connecting one with each of said chambers, and means forming a central channel connecting said orifices with said valve.

13. An expansion mechanism for refrigerant evaporators comprising an expansion valve, a distributor head having a plurality of outlet openings for connection to evaporators, said head including a plurality of chambers, one connecting with each of said outlets, means in said head forming a plurality of orifices having radial axes arranged in a substantially vertical plane connecting one with each of said chambers, means forming a central channel connecting said orifices with said valve, and means in said channel for preventing the segregation of unevaporated liquid from the gas passing therethrough.

14. An expansion mechanism for refrigerant evaporators comprising an expansion valve, a distributor head having a plurality of outlet openings for connection to evaporators, said head including a plurality of chambers, one connecting with each of said outlets, means in said head forming a plurality of orifices having radial axes connecting one with each of said chambers, means forming a central channel connecting said orifices with said valve, and means comprising a spiral spinner in said channel for preventing the segregation of unevaporated liquid from the gas passing therethrough.

15. An expansion mechanism for refrigerant evaporators, comprising an expansion valve, a distributor head having a plurality of outlet openings for connection to evaporators, said head including a plurality of chambers, one connecting with each of said outlets, means in said head forming a plurality of orifices connecting one with each of said chambers, means connecting said orifices with said valve, a diaphragm, a thermostat exposed to gas from said evaporators, means connecting one side of said diaphragm and said thermostat for moving said diaphragm proportional to temperature changes in said thermostat, means connecting said diaphragm and valve whereby said valve is moved with movements in said diaphragm, and means forming gas passages from said chambers to the other side of said diaphragm.

16. An expansion mechanism for refrigerant evaporators, comprising in combination, an expansion valve adapted to be supplied with high pressure refrigerant, a distributor head, a plurality of substantially similar evaporators, a plurality of substantially similar tubes connecting said head with said evaporators, means in said valve for expanding the high pressure refrigerant into a fluid of gas and liquid at an intermediate pressure, means forming a plurality of substantially similar constricted orifices, one for each of said tubes, each having a cross sectional area substantially less than the cross sectional area of the opening in its associated tube for substantially expanding said fluid into its associated tube, means for maintaining the fluid at a pressure not less than said intermediate pressure and means for preventing the segregation of gas and liquid in the fluid in its travel between said valve and said orifices.

HARRY E. MORTON.